United States Patent [19]

Ohtaka et al.

[11] Patent Number: 4,975,727
[45] Date of Patent: Dec. 4, 1990

[54] FOCUS DETECTING DEVICE

[75] Inventors: Keiji Ohtaka; Takeshi Koyama, both of Tokyo, Japan

[73] Assignee: Canon Kabushiki Kaisha, Tokyo, Japan

[21] Appl. No.: 391,717

[22] Filed: Aug. 7, 1989

Related U.S. Application Data

[63] Continuation of Ser. No. 127,631, Dec. 1, 1987, abandoned.

[30] Foreign Application Priority Data

Dec. 5, 1986 [JP] Japan .............................. 61-186801[U]

[51] Int. Cl.$^5$ .............................................. G03B 13/36
[52] U.S. Cl. ...................................... 354/402; 354/408
[58] Field of Search ................ 354/400, 402, 406–408, 354/65–74, 195.1, 482

[56] References Cited

U.S. PATENT DOCUMENTS

| 4,335,959 | 6/1982 | Manning | 354/482 |
| 4,474,448 | 10/1984 | Momiyama | 354/407 |
| 4,559,446 | 12/1985 | Suzuki | 354/408 |
| 4,650,309 | 3/1987 | Ishida et al. | 354/408 |
| 4,662,735 | 5/1987 | Karasaki et al. | 354/406 |

Primary Examiner—Russell E. Adams
Attorney, Agent, or Firm—Fitzpatrick, Cella, Harper & Scinto

[57] ABSTRACT

In a focus detecting device having optical means for forming a plurality of light quantity distributions from light fluxes passing through an objective lens and arrays of sensors arranged to sample the light quantity distributions and to separately produce signals, at least a part of the optical means is made of a material having a moisture absorption expansion coefficient $\alpha$ which is obtained at 100% humidity relative to 0% humidity and satisfies the following condition:

$$-0.23\% \leq \alpha \leq +0.23\%$$

1 Claim, 1 Drawing Sheet

FOCUS DETECTING DEVICE

This application is a continuation of application Ser. No. 127,631 filed Dec. 1, 1987, which is now abandoned.

BACKGROUND OF THE INVENTION

1. Field of the Invention:

This invention relates to a focus detecting device arranged to divide the pupil of an objective lens into a plurality of regions and to detect the focused state of the objective lens through the relative positions of a plurality of images formed by light fluxes passing through these regions and more particularly to an optical system to be employed in the focus detecting device.

2. Description of the Related Art:

Varied devices of the above stated kind have been proposed for use in cameras or the like. FIG. 1 of the accompanying drawings shows an example of the arrangement of optical systems being used for the conventional devices. An improvement on this arrangement has been disclosed in U.S. Pat. No. 4,699,493.

Referring to FIG. 1, the illustration includes an objective lens 1; a predetermined image forming plane 2 on which an image is to be formed by the lens 1; a field mask 3; a field lens 4 disposed close to the predetermined image forming plane 2; secondary image forming lenses 5a and 5b which have their optical axis in parallel to each other and are symmetric with respect to the optical axis of the objective lens 1; aperature stops 6a and 6b to which are arranged for the secondary image forming lenses 5a and 5b respectively; sensor arrays 7a and 7b which are disposed respectively behind and for the secondary image forming lenses 5a and 5b; and exit pupil regions 8a and 8b of the objective lens 1. Each of the secondary image forming lenses 5a and 5b is a positive lens. Further, the field lens 4 is arranged to form images of the aperture stops 6a and 6b in the vicinity of the exit pupil regions 8a and 8b of the objective lens 1. Light fluxes passing through these regions 8a and 8b are arranged to be incident on the sensor arrays 7a and 7b respectively. The light, is not limited to visible rays of light but invisible rays of light such as infrared rays also may be used.

A focus detecting device having the optical system which is arranged as described above is arranged as follows: In case the image forming point of the objective lens 1 is in front of the predetermined image forming plane 2, the secondary images which are formed on the two sensor arrays 7a and 7b are close to each other (toward the optical axis). When the image forming point of the lens 1 is in the rear of the predetermined image forming plane 2, the secondary images formed on these sensor arrays 7a and 7b are away from each other. The amount of deviation from each other of the two secondary images formed on the sensor arrays 7a and 7b is in a certain relation to the degree of defocus of the objective lens 1. The degree and the direction of the defocus of the objective lens is, therefore, detectable by computing the amount of deviation with some suitable computing means. One of known methods for computing the amount of deviation from each other of the two secondary images is disclosed, for example, in Japenese Patent Application Laid-Open No. SHO 59-107313 (corresponding to U.S. Pat. No. 4,559,446). This method is as briefly described below:

The outputs of the sensor arrays 7a and 7b are photoelectric converted. Assuming that the converted outputs are a(i) and b(i), wherein i is the number of from 1 to N, with N assumed to be the number of picture elements of each of the sensor arrays, and with a suitable constant integer k used, computation is performed for different integers m in accordance with the following formula:

$$V(m) = \sum_i \min \{a(i), b(i + k - m)\} - \sum_i \min \{a(i + k), b(i - m)\} \quad (1)$$

The range of i for obtaining a sum is set at such a value as to have i, i+k−m, i+k, i−m within a closed interval [1, N] and to have the variation ranges of the first and second terms of V(m) equal to each other. With one pitch of each of the sensor arrays used as a unit, a value of m which makes the value of V(m) zero represents the amount of deviation of the secondary images from each other. Generally, it is not always possible to have the integer m at such a value that makes the value of V(m) zero. This problem is soluble by obtaining a fraction in accordance with some suitable interpolating method. The simplest of interpolating methods are linear interpolation. Assuming that the sign is inverted between a value V(mO) and a value V(m1), the amount M of deviation which includes a fraction can be obtained from the following formula:

$$M = m0 + |V(m0)| / (|V(m0) + V(m1)|) \quad (2)$$

With the amount M of deviation from each other of the two secondary images thus obtained, the simplest method for computing the defocus degree d of the objective lens 1 is as follows: Assuming that the two images are approximately in proportion to each other, the defocus degree d can be obtained by using a constant of proportion k in accordance with the following formula:

$$d = k(M - \delta 0) \quad (3)$$

wherein δ0 represents an amount of deviation from each other of the two secondary images obtaine when the objective lens 1 is in an in-focus state. Hereinafter this value δ0 will be referred to as an initial deviation value. The initial deviation value δ0 is determined either during designing work on the device or by performing mesaurement during adjustment work in the initial stage of the device. A computing method which is an improvement over Formula (3) and gives the defocus degree d of the objective lens 1 with an improved degree of accuracy by performing a computing operation with the non-linear nature of the values d and M taken into consideration has been disclosed in Japanese Patent Application Laid-Open No. SHO 59-107313. However, since this method is not directly related to this invention, the details of that method are omitted herein.

As apparent from Formula (3) above, the focus detecting device uses the initial deviation degree δ0 as a datum. For accurate focus detection, this value δ0 must be unvarying. However, even if the initial deviation degree is at the value δ0, the various component members of the optical system vary as the circumstances vary. Therefore, the value δ0 does not remain unchanged. For example, a distance between the secondary image forming lenses 5a and 5b of FIG. 1 varies with changes in humidity and temperature. In that event, the value δ0 also changes. Generally, such variations due to temperature and humidity are not considered extreme. However, the degree of image deviation relative to the defocus degree d of the objective lens 1 is very small ranging from one tenth to several tenths of the defocus degree. Therefore, even a slight change in the value δ0 is detrimental to accurate detection of the focused state of the objective lens 1.

In case the optical members are made of an acrylic resin material in particular, they greatly expand and contract due to changes in temperature and humidity. In addition to this, their refractive index also changes to further affect the detection accuracy.

In one of a member of conceivable methods for solving this problem, a temperature and humidity sensor is provided within the optical system and the result of detection is corrected according to the output of that sensor. However, at present, it is hardly possible to find any sensor that is accurate and easy to handle. Even if such a sensor is obtainable, it would necessitate and additional space for that sensor and thus would result in an increase in cost. The adverse effect of temperature and humidity which varies every moment gradually permeates each component member from the surface thereof. Therefore, it is hardly possible to accurately make correction solely on the basis of the temperature and humidity obtained at the moment at which the correction is effected.

SUMMARY OF THE INVENTION

It is an object of this invention to provide a focus detecting device which solves the above stated problems of the prior art and is capable of always stably performing focus detection with a high degree of accuracy under any unfavorable humid conditions.

The above and other objects and features of this invention will become apparent from the following detailed description of a preferred embodiment thereof taken in connection with the accompanying drawings.

DETAILED DESCRIPTION OF THE PREFERRED EMBODIMENT

The inventors of the present invention have conducted tests wherein the properties of some materials that excel in moisture resistance are examined and the use of them in place of an acrylic resin material for a focus detecting device is tested. Through these tests, it has been ascertained that the degradation of focus detecting accuracy resulting from moisture absorption can be prevented by forming the secondary image forming lenses 5a and 5b of FIG. 1 with a polycarbonate resin (hereinafter referred to as PC) material.

Figure 1:
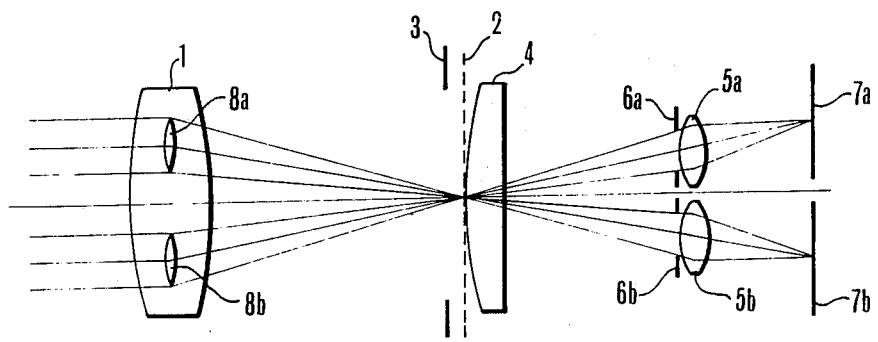
FIG. 1 schematically shows the arrangement of the optical system of a focus detecting device.
Figure 2:
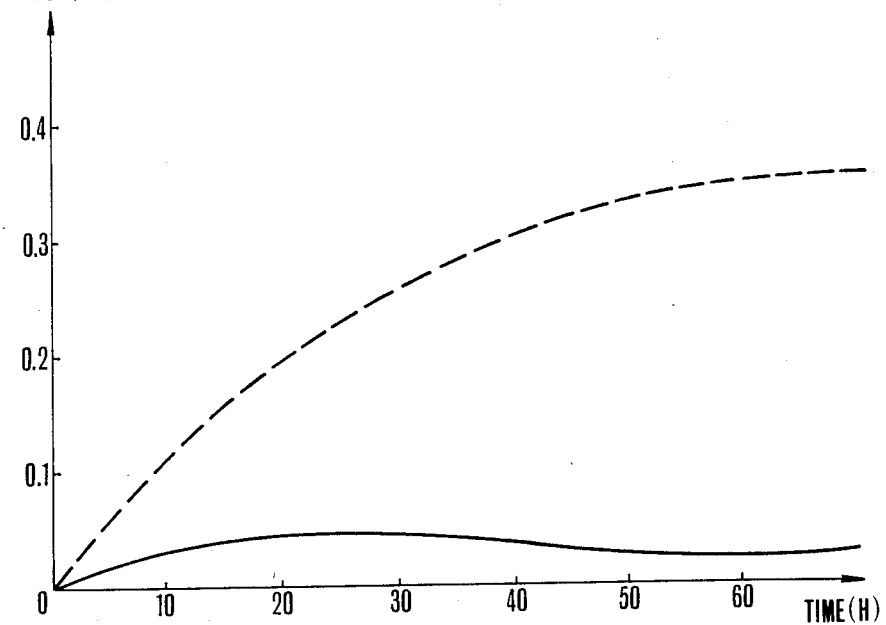
FIG. 2 shows a focus variation characteristic of an embodiment of this invention and that of the conventional device resulting from changes in humidity.

FIG. 2 shows the results of the above stated tests. In one test, the secondary lenses 5a and 5b were formed with an acrylic material. In another, they were formed with the PC material. In each case, focus variations (or degrees of deviation from an in-focus state) were measured. In each case of these tests, an optical system which was arranged as shown in FIG. 1 was placed under an ambient condition measuring 45° C. in temperature and 20% in humidity for a sufficiently long period of time. A focus detecting device which was equipped with this optical system was left intact under a condition of temperature 45° C. and humidity 95%. Then, the temporal changes which took place in the focused state of the optical system under this condition were measured. In FIG. 2, a broken line curve shows the result of test of the acrylic resin material. As shown, the focal deviation simply increases with time. A defocus degree of about 0.35 mm is obtained after the lapse of about 60 hours. Meanwhile, in the case of the PC material indicated by a full line curve, the defocus degree reaches a peak value of about 0.05 mm after the lapse of about 20 hours. Then, the peak values comes to gradually decrease. The degree of defocus then eventually comes to settle at about 0.02 to 0.03 mm. In the case of the PC material, the primary peak of the focal deviation is considered to be caused by the refractive index distribution within the secondary optical sytem as a result of moisture absorption. Therefore, the variations in focal deviation lessens as the refractive index becomes uniform with moisture absorption advanced to reach a saturated state. Such a refractive index is considered to be occurring also in the case of the acrylic resin material. In that case, however, it seems to be not observable as a peak in the focal deviation because of a greater change caused by the moisture absorption in the distance between the secondary image forming lenses 5a and 5b. In order to lessen the variations in the focused state of the optical system due to moisture absorption, the material to be used for the secondary image forming lenses 5a and 5b must be selected in consideration of the following two points:

(1) A small rate of expansion due to moisture absorption. (2) A small rate of changes in refractive index due to moisture absorption.

Table 1 below shows the characteristic values of the acrylic resin material and the PC material:

TABLE 1

|  | Acrylic resin material | PC material |
|---|---|---|
| Moisture absorption expansion rate | 0.4% | 0.04% |
| Change of refractive index due to moisture absorption | $1/5 \times 10^{-3}$ | less than $1.0 \times 10^{-4}$ |

The values shown in Table 1 above indicate changes taking place in the rate of expansion and in the refractive index at a humidity 100% in relation to a 0% humidity condition. As shown in Table 1, the rate of expansion due to moisture absorption of the PC material is about 1/10 of that of the acrylic resin material. The change in refractive index due to moisture absorption of the former is about 1/15 of that of the latter. The former thus obviously excels in moisture resistance.

The device of this kind is used, for example, for a single-lens reflex camera or the like. In the case of application to a camera, the maximum focal change allowable under the most severe humid circumstances may be assumed to correspond to the depth of focus obtainable at F-5.6. Then, with the diameter of the minimum circle of confusion assumed to be 0.035 mm, the allowable focal change (or deviation) is about 0.2 mm. Further, with the focal change assumed to be nearly proportional to the coefficient of expansion due to moisture absorption, a coefficient of expansion due to moisture absorption which is required for restricting the focal change to a value less than 0.2 mm may be preferably within a range of ±0.23% or thereabout. In other words, with the coefficient of expansion due to moisture absorption assumed to be $\alpha$, the secondary optical system is preferably made of a material that satisfies the following condition:

$$-0.23\% \leq \alpha \leq +0.23\%$$

wherein the coefficient $\alpha$ of expansion due to moisture absorption indicates a linear expansion coefficient of the material obtained at 100% humidity in relation to 0% humidity.

As regards the changes in the refractive index due to moisture absorption, changes such as those of the acrylic resin material may be regarded as presenting no problem with a saturated condition solely taken into consideration. However, in the light of some possible transient condition, the change $\Delta N$ in the refractive index is preferably less than that of the acrylic resin material and meets the following condition:

$$-0.8 \times 10^{-3} \leq \Delta N \leq +0.8 \times 10^{-3}$$

Materials that meets the above stated conditions include, besides the PC material, a polystyrene material; an acrylonitrile-styrene copolymer (AS) resin material; a methacrylate-styrene copolymer (MS) resin material; etc. Meanwhile, like in the case of plastics, techniques for glass molding has recently advanced. As a result, it has become possible to mold the secondary optical system in one unified body. This glass molding technique has been partly practicalized. The use of glass in that manner would be ideal in terms of not only moisture resistance but also resistance to changes in temperature.

In accordance with the arrangement of this embodiment, the secondary image forming lenses 5a and 5b are formed with a material of excellent moisture resistance such as a polycarbonate resin material. Therefore, the focal variations due to changes in humidity can be lessened for increased accuracy of focus detection.

In the foregoing description of this embodiment, the use of a material excelling in moisture resistance is described as used only for forming the secondary image forming lenses 5a and 5b. However, it goes without saying that other optical systems such as field lens, etc. also may be formed with a like material.

In accordance with this invention, as described in the foregoing, at least a part of the optical means is formed with a material having a moisture absorption expansion coefficient $\alpha$ which is a coefficient of linear expansion obtained at 100% humidity relative to 0% humidity and satisfies the following condition:

$$-0.23\% \leq \alpha \leq +0.23\%$$

The changes in volume and in refractive index are thus minimized. Therefore, this enables the device to always stably and accurately perform focus detection under any humid circumstances.

What is claimed is:

1. A device for detecting a focus adjusting state of an objective lens, comprising:
   a field lens located in proximity to an image forming plane of the objective lens;
   light distribution forming means, having a plurality of image forming optical components, for forming, from light fluxes passing through said field lens, light distributions which change their relative positions according to the focus adjusting state of said objective lens, said image forming optical components being made of polystyrene for minimizing moisture absorption in said light distribution forming means to minimize focal length changes caused by humidity; and
   sensing means having a plurality of sensors for sensing said light distributions and for producing an electrical signal indicative of the focus adjusting state of said objective lens depending on the relative positions of said light distributions.

* * * * *

UNITED STATES PATENT AND TRADEMARK OFFICE
CERTIFICATE OF CORRECTION

PATENT NO. : 4,975,727
DATED : December 4, 1990
INVENTOR(S) : Keiji Ohtaka, et. al.

It is certified that error appears in the above-identified patent and that said Letters Patent is hereby corrected as shown below:

COLUMN 2:

- Line 44, "obtaine" should read --obtained--.

COLUMN 3:

Line 14, "member" should read --number--; and

Line 20, "and" should read --an--.

COLUMN 4:

Line 13, "peak values" should read --peak value--.

COLUMN 6:

Line 5, "as" should read --as a--.

Signed and Sealed this

Eighteenth Day of August, 1992

Attest:

DOUGLAS B. COMER

*Attesting Officer*   *Acting Commissioner of Patents and Trademarks*